United States Patent [19]
Saito et al.

[11] Patent Number: 5,706,127
[45] Date of Patent: Jan. 6, 1998

[54] ELECTRICALLY DRIVEN MICROSCOPE

[75] Inventors: Hiroko Saito, Yokosuka; Masahiko Otomo, Fujisawa, both of Japan

[73] Assignee: Nikon Corporation, Tokyo, Japan

[21] Appl. No.: 593,461

[22] Filed: Jan. 29, 1996

[30] Foreign Application Priority Data

Jan. 30, 1995 [JP] Japan .................................. 7-012145

[51] Int. Cl.⁶ .......................... G02B 21/00; G02B 21/26; G02B 7/16
[52] U.S. Cl. .......................... 359/381; 359/368; 364/525
[58] Field of Search .................................. 359/381, 368, 359/382, 392, 388; 364/525

[56] References Cited

U.S. PATENT DOCUMENTS

| 4,643,540 | 2/1987 | Kawasaki et al. |  |
|---|---|---|---|
| 4,653,878 | 3/1987 | Nakasato et al. | 359/392 |
| 4,661,692 | 4/1987 | Kawasaki | 359/381 |
| 5,260,825 | 11/1993 | Nagano et al. | 359/368 |

FOREIGN PATENT DOCUMENTS

| 453239 A1 | 10/1991 | European Pat. Off. | 359/368 |
| 3933064 A1 | 4/1990 | Germany | 359/392 |
| 3-15015 | 1/1991 | Japan | 359/368 |
| 6-114077 | 4/1994 | Japan | 359/368 |
| 6-222269 | 8/1994 | Japan . | |

Primary Examiner—Jon W. Henry
Attorney, Agent, or Firm—Shapiro and Shapiro

[57] ABSTRACT

An electrically driven type microscope may include an interchanging device which interchanges a plurality of objective lenses, a determination device for determining which of the lenses is disposed in an optical path of the microscope, an adjusting system of which adjustment is effected during observation of a sample, a manually settable operating system for drivingly operating the adjusting system, a data recording portion for recording plural sets of manual setting information, each set corresponding to a different objective lens and containing information indicating at least one manual setting of the operating system for the corresponding objective lens, an electrical driving system for driving the adjusting system, and a driving control circuit for controlling the electrical driving system based on information from the set of manual setting information corresponding to an objective lens determined to be in the optical path by the determination device in association with an interchange effected by the interchanging device, thereby effecting adjustment of the adjusting system.

19 Claims, 11 Drawing Sheets

ELECTRICALLY DRIVEN MICROSCOPE

BACKGROUND OF THE INVENTION

1. Field of the Invention

This invention relates to an electrically driven type microscope having an electrically driven revolver, an electrically driven stage, etc.

2. Related Background Art

Today, among microscopes of high function used in research or the like, there are ones in which an illuminating device such as a halogen lamp is incorporated and an aperture stop device and a field stop are provided and in addition, an ND filter for adjusting brightness and the adjustment of the luminance of the lamp itself is possible.

Also, in many of them, the vertical movement of a stage is done in an electrically driven manner and further, a revolver on which an objective lens is mounted is rotatively driven by electrical control. In such a microscope having various adjusting members for effecting adjustment when a sample is to be observed, the whole of the microscope including the stage becomes bulky. Also, when the objective lens has been interchanged by an electrically driven revolver or the like, the position of the stage has been adjusted and the adjustment of a stop and a light source has been effected as required, whereby the observation of a sample has been done.

Furthermore, some of such microscopes have an adjusting member such as a turret condenser, in addition to a vertically movable stage, a light source and a stop.

Such a microscope is often used jointly by several researchers.

As previously described, in such a microscope, there is provided an illuminating device and adjusting members such as various stops, besides a stage vertically movable with a sample placed thereon, and when the revolver is rotated to thereby interchange the objective lens, it is often the case that the position adjustment of the stage must be done in accordance with a change in the focal length of the objective lens and also the illumination characteristics (such as, for example, illumination intensity and illumination field) must be re-adjusted. Particularly when a sample to be inspected is to be photographed, the adjustment of the stop and illumination becomes important. To obtain a good image, there are many portions which need be adjusted, and some of photographers sometimes set their unique stop adjustment and illumination adjustment. Accordingly, when the setting of these adjusting members is changed by another user of the microscope, much time and labor are required for re-adjustment.

There is an electrically driven type microscope in which an electrically driven condenser is changed over in accordance with the rotation of an electrically driven revolver to thereby decrease portions to be adjusted during the interchange of an objective lens (for example, Japanese Patent Application Laid-open No. 6-222269), but for the operative association with such a revolver, the operative association must be set and inputted in advance, and much trouble has also been required for the preparation for the observation by the microscope.

SUMMARY OF THE INVENTION

The present invention provides an electrically driven type microscope which reduces the time and trouble required for such a preparation for observation and makes efficient observation possible.

An electrically driven type microscope according to the present invention may include:

- an interchanging device which interchanges a plurality of objective lenses;
- a determination device for determining which of said lenses is disposed in an optical path of the microscope;
- an adjusting system of which adjustment is effected during observation of a sample;
- a manually settable operating system for drivingly operating said adjusting system;
- a data recording portion for recording plural sets of manual setting information, each set corresponding to a different objective lens and containing information indicating at least one manual setting of said operating system for the corresponding objective lens;
- an electrical driving system for driving said adjusting system; and
- a driving control circuit for controlling said electrical driving system based on information from the set of manual setting information corresponding to an objective lens determined to be in said optical path by said determination device in association with an interchange effected by said interchanging device, thereby effecting adjustment of said adjusting system.

The electrically driven type microscope of the present invention may also include the data recording portion for recording at least one of the places of manual setting information of the adjusting system correspondingly to the objective lens and therefore, when an observer has operated an adjusting system during the observation of a sample and sets his favorite setting, the setting of that adjusting system can be recorded on the data recording portion, and also, the electrically driven type microscope of the present invention may include the drive controlling circuit for controlling the electrical driving device on the basis of manual setting information recorded on the data recording portion and therefore, when a revolver has been rotated and the objective lens has been interchanged, the last setting of the adjusting system to a new objective lens can be reproduced.

Other adjusting mechanisms of the microscope may include, for example, a stage vertically moving device, the stop portions of a field stop device and an aperture stop device, the lamp power source adjusting portion of an illuminating device, the filter adjusting device of a light adjusting device, etc. Of those mentioned above, the other devices than the stage vertically moving device are all mechanisms for changing the illumination characteristics of the microscope.

DESCRIPTION OF THE PREFERRED EMBODIMENTS

Figure 1:
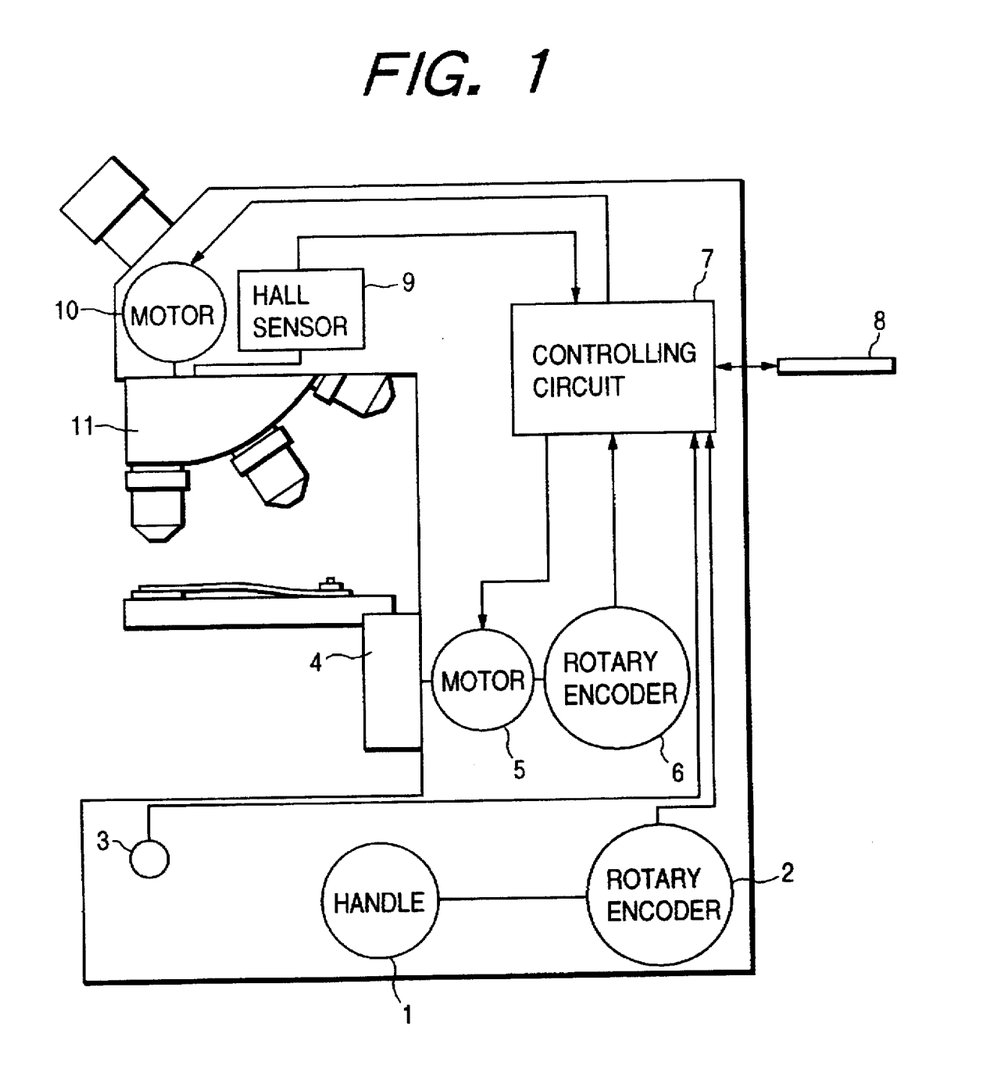
FIG. 1 is a schematic view of a first embodiment and a second embodiment of an electrically driven type microscope according to the present invention.

In a first embodiment of an electrically driven type microscope according to the present invention, as shown in FIG. 1, a rotary encoder 2 detects the amount of rotation of a handle 1 and outputs it to a controlling circuit 7 containing a microcomputer therein. A rotary encoder 6 detects the amount of rotation of a motor 5 for driving a stage vertically moving portion 4 for vertically moving a stage and outputs it to the controlling circuit 7. The controlling circuit 7 rotatively controls the motor 5 in accordance with the amount of rotation of the handle 1 and adjusts a sample fixedly placed on the stage to the focal position of an objective lens mounted on an electrically driven revolver 11. Also, by operating a revolver rotating key 3, a motor 10 is driven through the controlling circuit 7 to thereby rotate the electrically driven revolver 11 and interchange the objective lens in use. The address of the electrically driven revolver 11, i.e., the number of the objective lens in use, is detected by a hall sensor 9, and the number of the objective lens is output to the controlling circuit.

In this electrically driven type microscope, a recording medium such as an IC card 8 is used and each time the electrically driven revolver 11 is operated, the positional information of the stage for each objective lens is recorded on the IC card 8.

Figure 2:
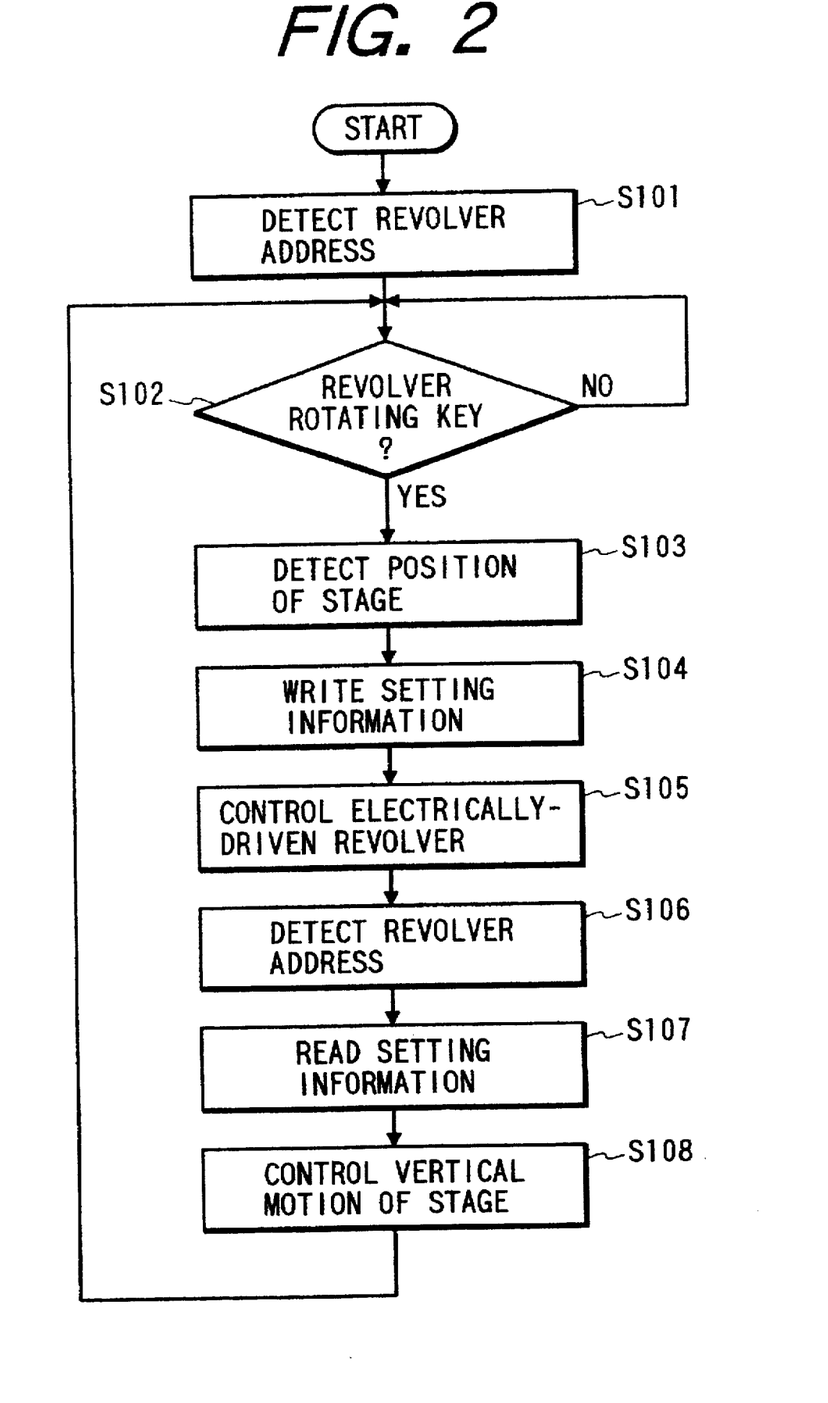
FIG. 2 is a flow chart showing the operation of the first embodiment of the electrically driven type microscope according to the present invention.

The operation of the present embodiment will now be described with reference to FIG. 2. As shown in FIG. 2, the revolver address is detected by the hall sensor 9 (S101), and the program waits until the revolver rotating key 3 is operated (S102). When the revolver rotating key 3 is operated, the position of the stage which is an adjusting mechanism is first detected by the rotary encoder 6 (S103). This positional information of the stage, together with the revolver address detected by the hall sensor 9, is recorded on the IC card 8 (S104). Thereafter, an observer operates the revolver rotating key 3 to thereby rotate the electrically driven revolver 11 and change over the objective lens (S105). The controlling circuit 7 reads the revolver address of a position at which the electrically driven revolver 11 has been stopped (S106), reads the information of the stage position recorded on the IC card 8 at this revolver address (S107), and controls the motor 5 so as to adjust the stage to this stage position, thereby effecting the alignment of the stage (S108). Thereafter, the program waits until the revolver rotating key 3 is operated. As described above, the microscope of the present embodiment records the positional information of the electrically driven revolver 11 and the information of the adjusted position of the stage (manual setting information) during the interchange of the objective lens and carries out the automatic adjusting process for the adjusting mechanism after the electrically driven revolver 11 is rotated to thereby interchange the objective lens.

It is preferable to prerecord on the IC card 8, in accordance with the objective lens of the microscope, the information of the standard set position of the stage in which the sample placed on the stage is positioned at the focal position of each objective lens.

In the present embodiment, when the revolver rotating key 3 is operated to interchange the objective lens with one of a different magnification, the revolver address for specifying the objective lens so far used and the positional information of the stage are first recorded on the IC card 8, whereafter the rotation of the electrically driven revolver 11 is controlled in accordance with the operation of the revolver rotating key 3. Assuming that the user of the microscope has adjusted the position of the stage in conformity with an objective lens of each magnification, the position of the stage which has been regarded as being proper by that user of the microscope is recorded on the IC card 8 in conformity with the information of the revolver address, i.e., the magnification of the objective lens.

Further, when the electrically driven revolver 11 is rotated by the operation of the revolver rotating key 3, the controlling circuit 7 reads out of the IC card 8 the positional information of the stage recorded correspondingly to the information of the revolver address, and controls the motor 5 on the basis of this positional information to thereby move the stage. Accordingly, the stage position can be automatically adjusted to the stage position regarded as optimum at the last time for the magnification of the objective lens.

A second embodiment of the present invention will now be described. The second embodiment, like the first embodiment, causes the manual setting information of the stage vertically moving device 4 regarding the stage to be recorded, but records a plurality of pieces of manual setting information with respect to one and the same objective lens. The construction of the microscope of the second embodiment is similar to that of the first embodiment and therefore need not be described.

Figure 3:
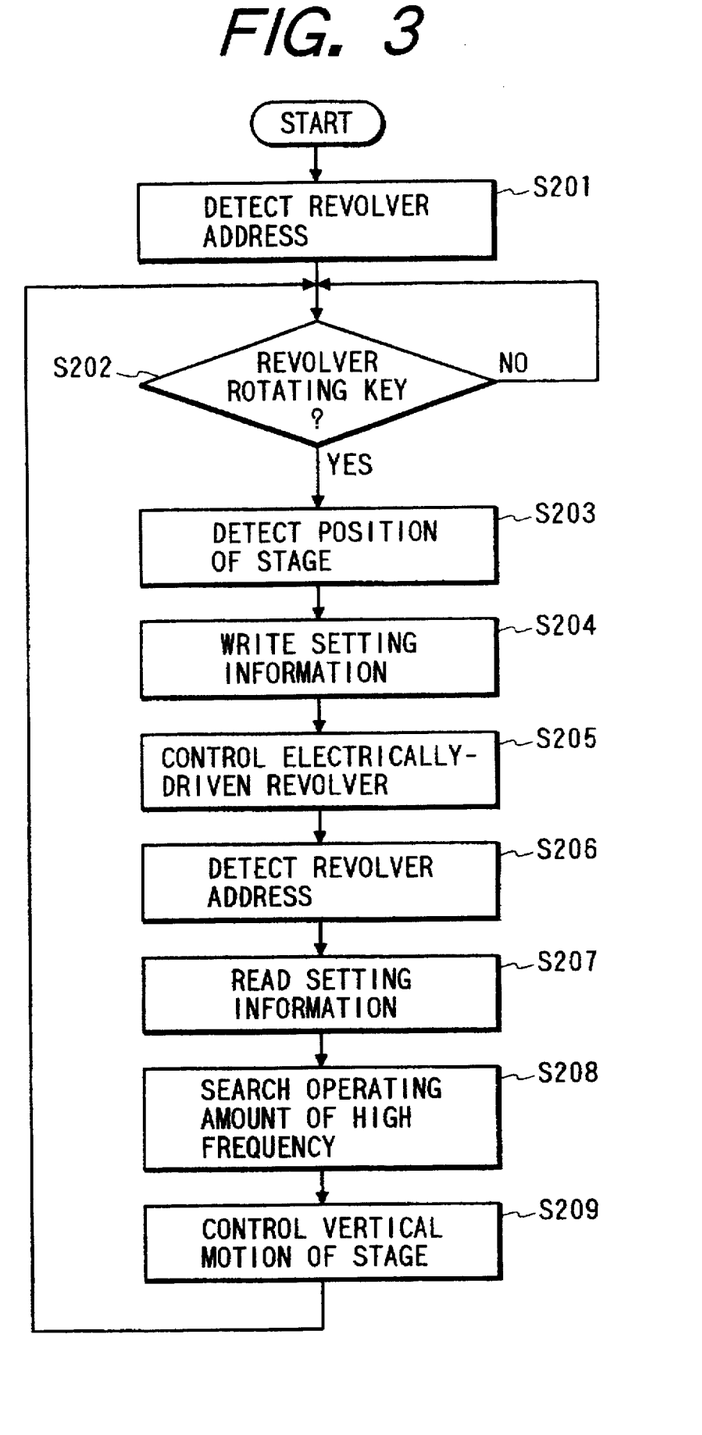
FIG. 3 is a flow chart showing the operation of the second embodiment of the electrically driven type microscope according to the present invention.

FIG. 3 is a flow chart showing the operation of the second embodiment. As shown in FIG. 3, the revolver address is detected by the hall sensor 9 (S201), and the program waits until the revolver rotating key 3 is operated (S202). When the revolver rotating key 3 is operated, the position of the stage is first detected by the rotary encoder 6 (S203). The controlling circuit 7 records this positional information of the stage on the IC card 8 in accordance with a revolver address detected by the hall sensor 9 (S204). When the observer operates the revolver rotating key 3, the controlling circuit 7 writes the positional information of the stage into the IC card. At this time, it records in such a manner that the current positional information of the stage is added to the positional information of the stage written at the last time. That is, a plurality of pieces of positional information of the stage are recorded for each objective lens.

Subsequently, the electrically driven revolver 1 is rotated by the operator's operation of the revolver rotating key 3 (S205), and the controlling circuit 7 reads the revolver address of a position at which the electrically driven revolver 11 has been stopped (S206), and reads the plurality of bits of stage positional information recorded on the IC card 8 at this revolver address (S207). The most frequently used stage position is searched from the plurality of pieces of manual setting information (S208), and the stage is adjusted to the stage position chosen by this search.

Instead of a case where the stage position is searched by frequency to thereby adjust the stage position, the average value of the plurality of pieces of stage positional information may be calculated and the stage position for the objective lens in use may be determined by this average value.

A third embodiment of the present invention is an electrically driven type microscope in which an automatically adjustable field stop device is the adjusting mechanism and the adjustment of the field stop device in accordance with the magnification of the objective lens is automatically effected.

Figure 4:
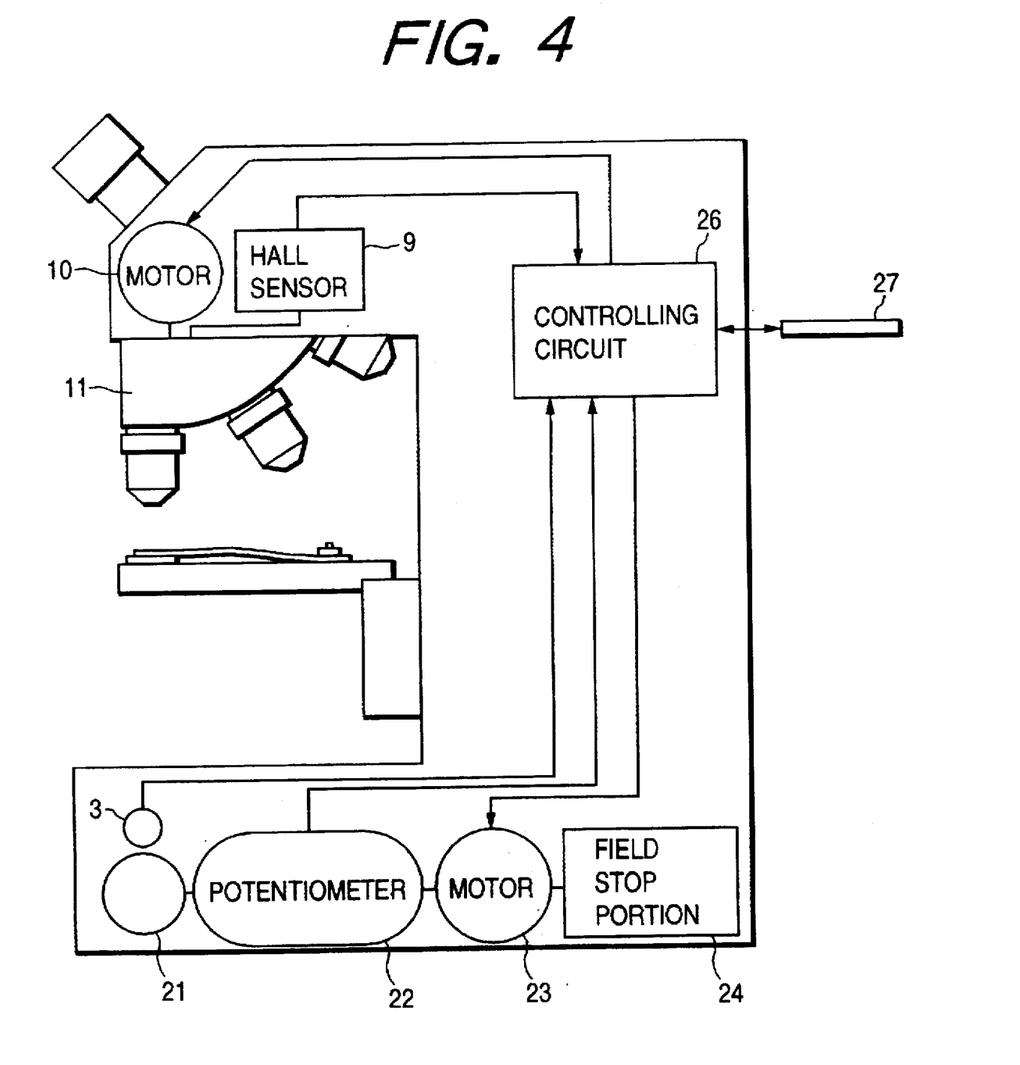
FIG. 4 is a schematic view of a third embodiment of the electrically driven type microscope according to the present invention.

The construction of this third embodiment is schematically shown in FIG. 4. Mechanisms functionally similar to those in the first and second embodiments are given the same reference numerals and need not be described again.

The microscope of the present embodiment is such that by the dial 21 of the field stop device being manually operated, the stop portion 24 of the field stop device is adjusted. A potentiometer 22 is provided on the rotary shaft of the field stop dial 21 which is an operating mechanism, and provision is further made of a motor 23 for driving the stop portion 24.

A controlling circuit 26 rotatively controls the electrically driven revolver 11 by the motor 10 while confirming the position of the electrically driven revolver 11 by the hall sensor 9, on the basis of the operation of the revolver rotating key 3. It also detects the amount of aperture of the field stop portion 24 by a signal from the potentiometer 22. It also drivingly controls the motor 23 to thereby make the amount of aperture by the field stop portion 24 changeable and adjustable.

In this third embodiment, unlike the first embodiment, the manual setting information is not written into the IC card when the revolver rotating key is operated, but each time the field stop is changed, the changed manual setting information is written into the IC card.

Figure 5:
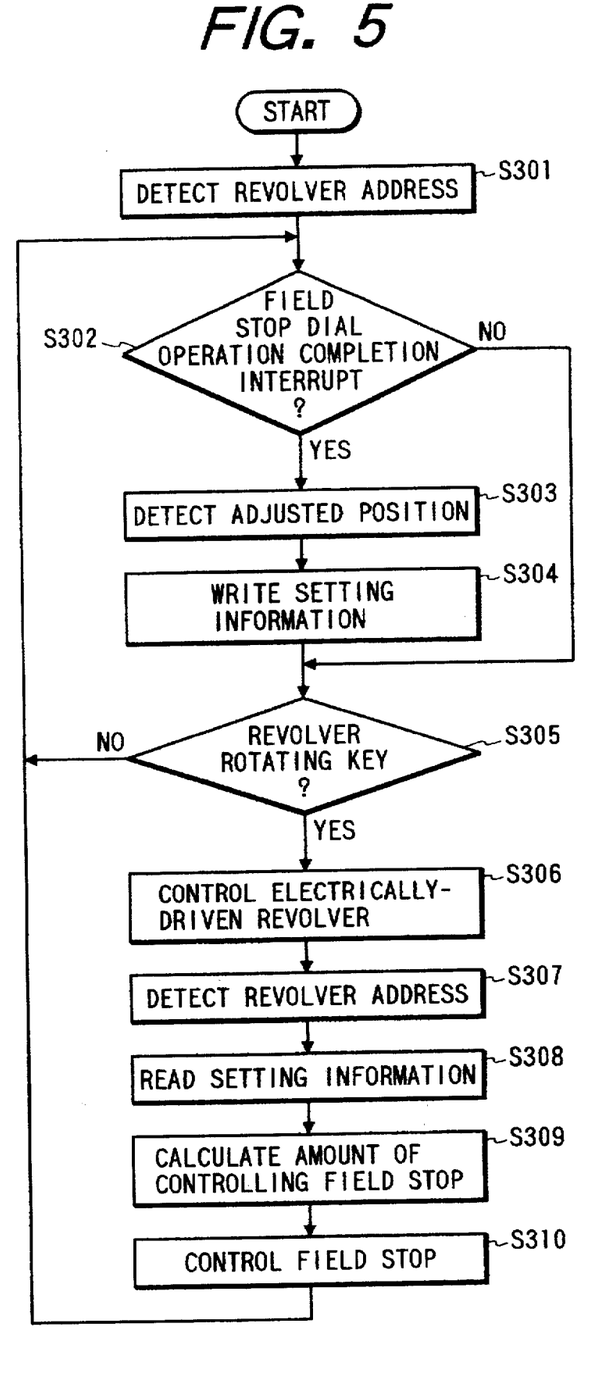
FIG. 5 is a flow chart showing an example of the operation of the third embodiment of the electrically driven type microscope according to the present invention.

The operation of the third embodiment will hereinafter be described with reference to FIG. 5. As shown in FIG. 5, a microcomputer incorporated in the controlling circuit 26 detects a revolver address in advance (S301). When the field stop dial 21 is operated and the operation of the field stop device is completed, an interrupt process is carried out to the microcomputer (S302). By this interrupt process, the controlling circuit effects the detection of the position of the stop portion 24 of the field stop device with the aid of the value of the potentiometer 22 (S303). Further, it records the manual setting information of this stop portion 24 on the IC card 27 together with the positional information of the electrically driven revolver 11 (S304).

When the revolver rotating key 3 is then operated (S305), the controlling circuit 26 rotates the electrically driven revolver 11 by the motor 10 (S306). It then detects the revolver address by the hall sensor 9 (S307), and reads out the last manual setting information of the field stop device recorded on the IC card 27 in conformity with the revolver address (S308). It then calculates the amount of control of the field stop (S309), drives the motor 23 and controls the amount of aperture of the field stop portion 24 to the amount of aperture set at the last time in accordance with an objective lens newly selected (S310).

As described above, in the third embodiment, the proper amount of aperture of the stop portion 24 can be recorded on the IC card 27 for each of a plurality of objective lenses differing in magnification from one another, and when the electrically driven revolver 11 is operated, the amount of aperture of the stop portion 24 is automatically set to the amount of aperture set at the last time, in conformity with the magnification of a new objective lens.

The present embodiment, like the first embodiment, may be designed such that when the revolver rotating key 3 is operated, the setting information of the stop portion 24 may first be recorded on the IC card.

Figure 6:
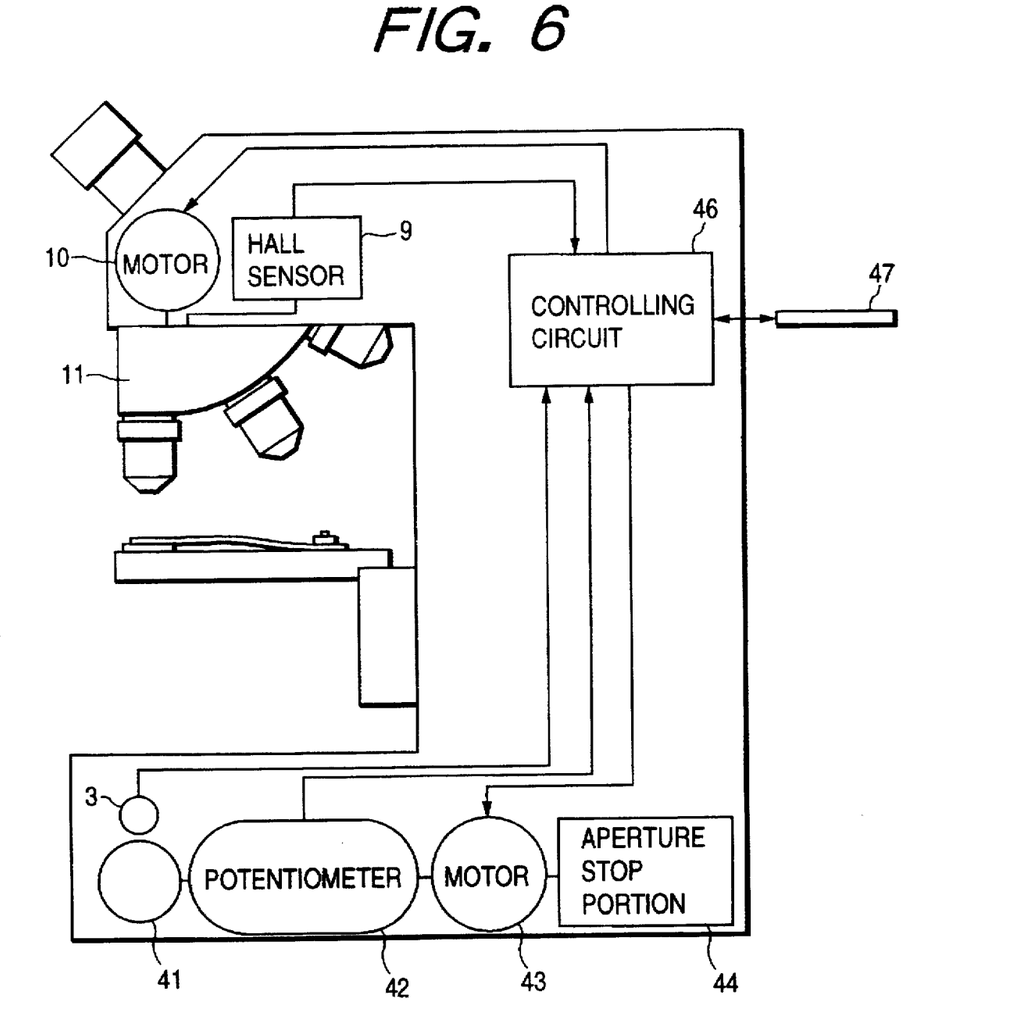
FIG. 6 is a schematic view of a fourth embodiment of the electrically driven type microscope according to the present invention.

The construction of a fourth embodiment of the microscope according to the present invention is schematically shown in FIG. 6. This fourth embodiment is an embodiment in which the field stop portion 24 in the first embodiment is replaced by an aperture stop portion 44. Provision is made of an aperture stop dial 41 for adjusting the amount of aperture of the aperture stop, a potentiometer 42 provided on the rotary shaft of the aperture stop dial 41, and a motor 43 for driving the aperture stop. Also, a controlling circuit 46 causes an IC card 47 to store therein the proper aperture value of the aperture stop set by the observer for each of a plurality of objective lenses differing in magnification from one another. In the other points, the construction of the fourth embodiment is similar to that of the third embodiment and therefore need not be described herein.

Figure 7:
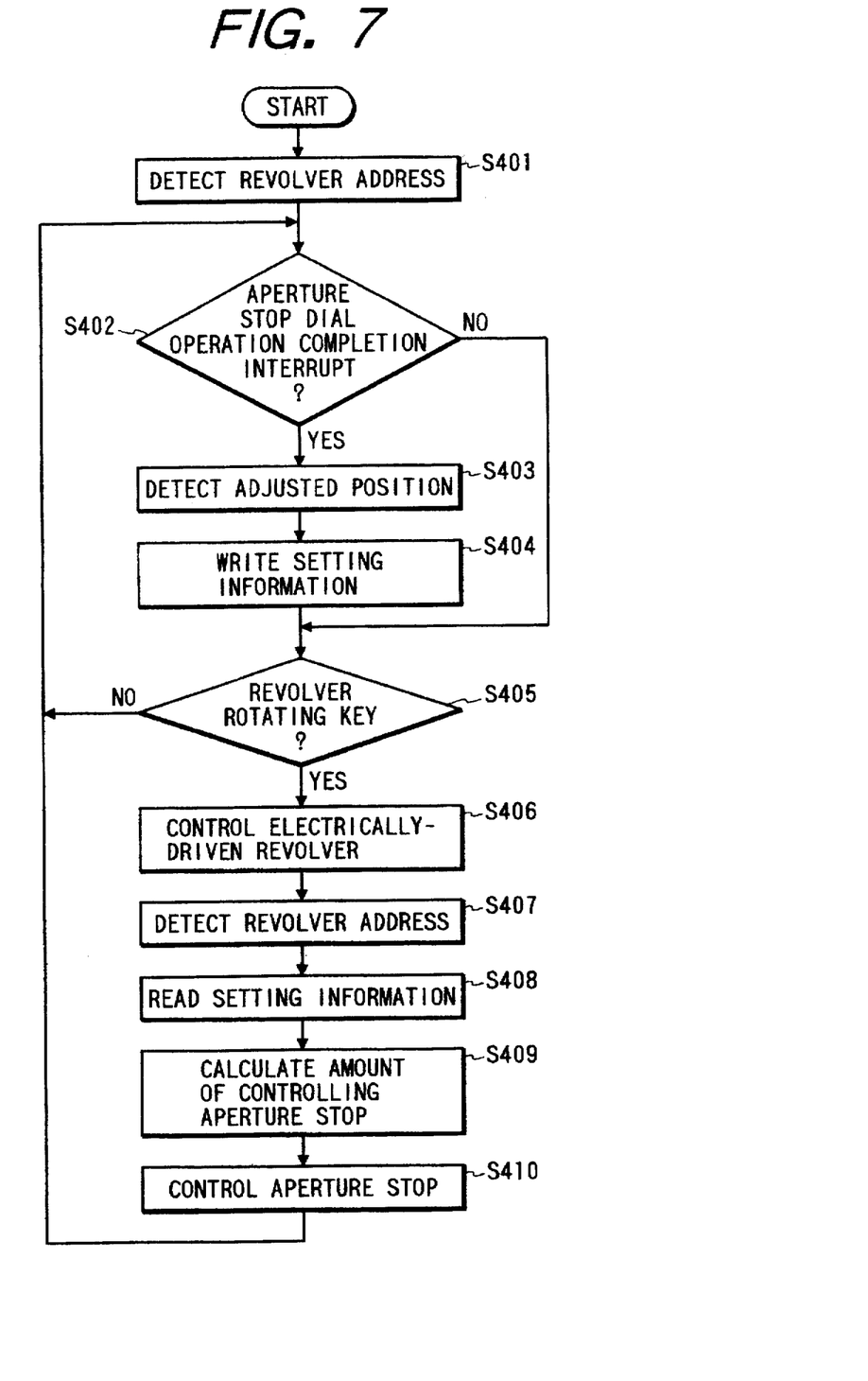
FIG. 7 is a flow chart showing an example of the operation of the fourth embodiment of the electrically driven type microscope according to the present invention.

The operation of the fourth embodiment is shown in FIG. 7. Again in the operation of the present embodiment, the field stop portion in the third embodiment is replaced by the aperture stop portion.

The controlling circuit detects a revolver address in advance (S401). When the operation of the aperture stop dial 41 is completed (S402), the controlling circuit 46 detects the amount of aperture of the aperture stop portion 44 (S403) and records it on the IC card 47 together with the positional information of the electrically driven revolver 11 (S404).

When the revolver rotating key 3 is then operated (S405), the controlling circuit 46 rotates the electrically driven revolver 11 by the motor 10 (S406). It then detects the revolver address by the hall sensor 9(S407), and reads out the last manual setting information of the aperture stop device recorded on the IC card 47 in conformity with the revolver address (S408). It then calculates the amount of control of the aperture stop (S409), and controls the amount of aperture of the aperture stop portion 44 to the amount of aperture set at the last time in accordance with an objective lens newly selected (S410).

Figure 8:
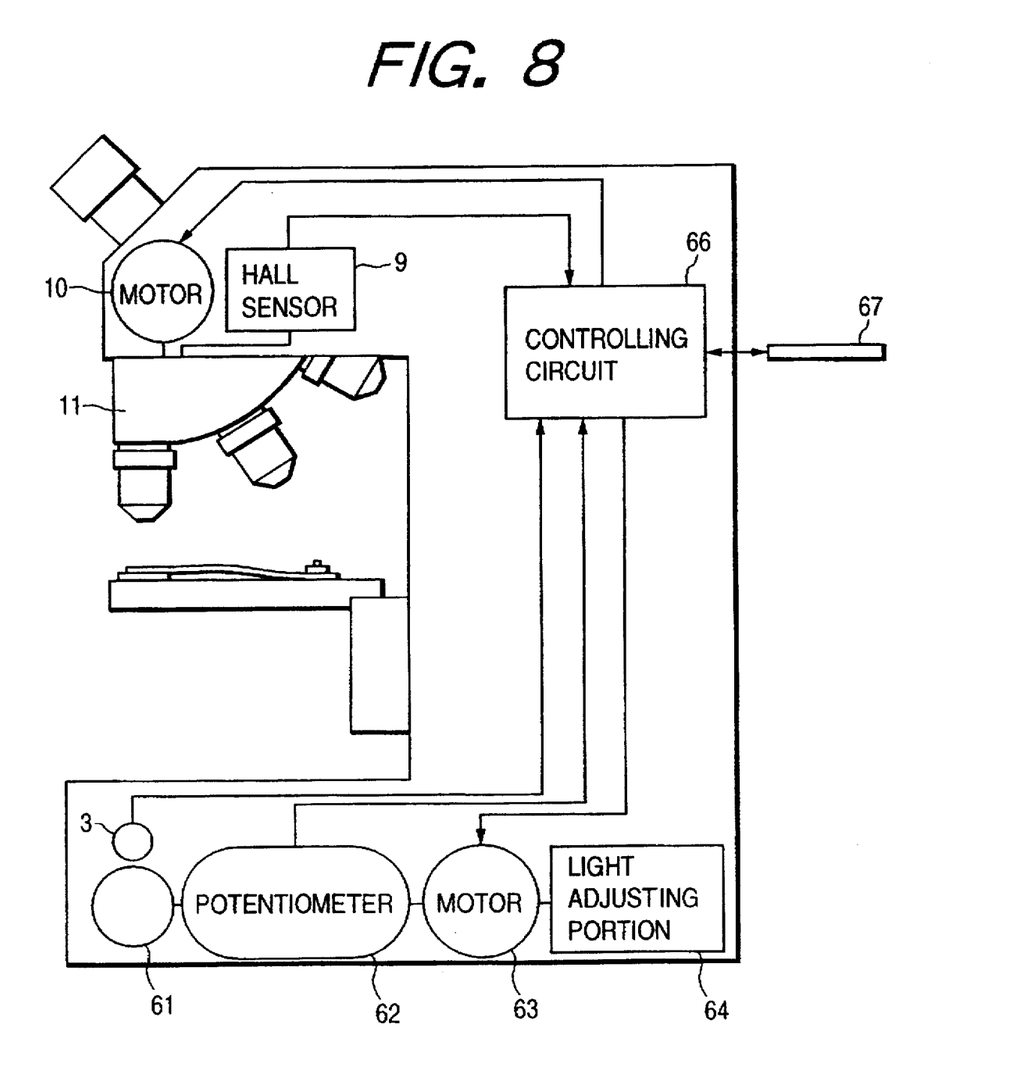
FIG. 8 is a schematic view of a fifth embodiment of the electrically driven type microscope according to the present invention.

The construction of a fifth embodiment of the microscope according to the present invention is schematically shown in FIG. 8. This fifth embodiment is an embodiment in which the field stop portion 24 in the third embodiment is replaced by a light adjusting portion 64 comprising an ND filter. Provision is made of a light adjusting dial 61 for adjusting the transmittance of light through the light adjusting portion 64, a potentiometer 62 provided on the rotary shaft of the light adjusting dial 61, and a motor 63 for driving the light adjusting portion. A controlling circuit 66 causes an IC card 67 to store therein a proper transmittance set by the observer (the adjusted position of the light adjusting dial) for each of a plurality of objective lenses differing in magnification from one another. In the other points, the construction of the fifth embodiment is similar to that of the third embodiment and therefore need not be described herein.

Figure 9:
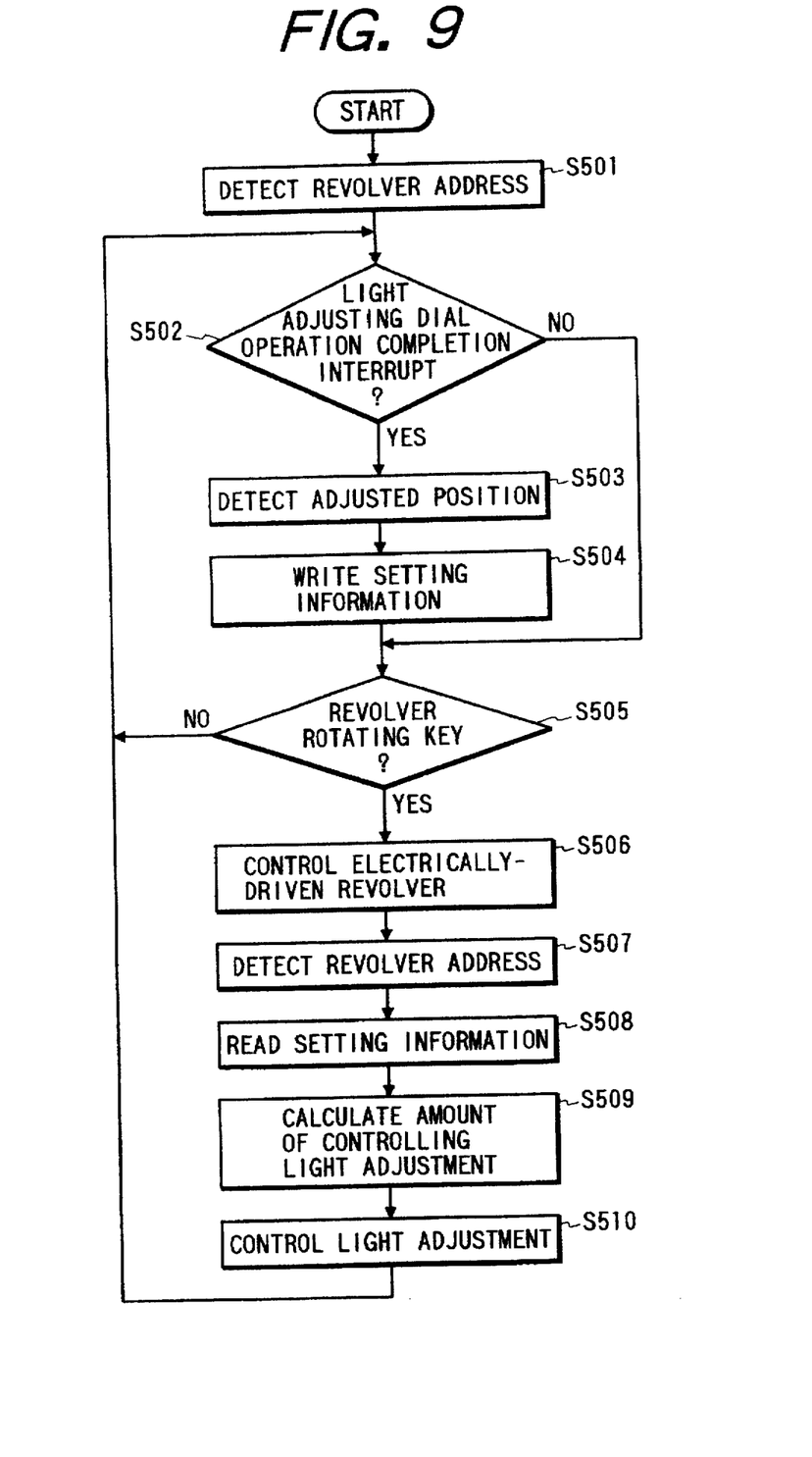
FIG. 9 is a flow chart showing an example of the operation of the fifth embodiment of the electrically driven type microscope according to the present invention.

The operation of the fifth embodiment is shown in FIG. 9. Again in the operation of the present embodiment, the field stop portion in the third embodiment is replaced by the light adjusting portion.

The controlling circuit 66 detects a revolver address in advance (S501). When the operation of the light adjusting dial 61 is completed (S502), the controlling circuit 66 detects the position of the light adjusting dial 61 (S503) and records it on the IC card 67 together with the positional information of the electrically driven revolver 11 (S504).

When the revolver rotating key 3 is then operated (S505), the controlling circuit 66 rotates the electrically driven revolver 11 by the motor 10 (S506). It then detects the revolver address by the hall sensor 9 (S507), and reads out the manual setting information of the last dial position recorded on the IC card 67 in conformity with the revolver address (S508). It then calculates the amount of control of the position of the light adjusting dial (S509) and controls that dial position to the position set at the last time in accordance with an objective lens newly selected (S510).

Figure 10:
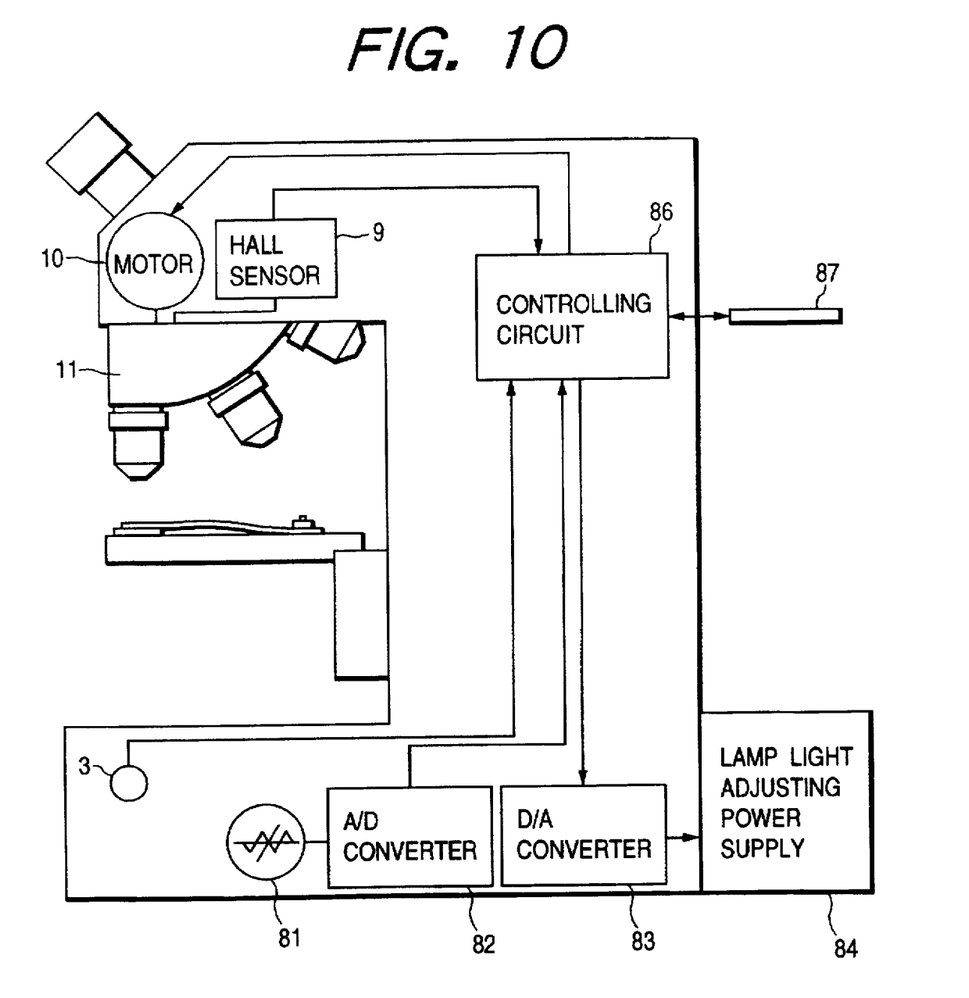
FIG. 10 is a schematic view of a sixth embodiment of the electrically driven type microscope according to the present invention.

A sixth embodiment of the microscope according to the present invention will now be described. FIG. 10 schematically shows the construction of the sixth embodiment. This embodiment is one in which a lamp light source is used as the adjusting mechanism. As shown in FIG. 10, in a microscope wherein the luminance of a lamp is adjustable, the adjustment of the luminance of a lamp in a lamp light adjusting power supply 84 is effected by adjusting a voltage adjuster 81, through an analog-digital converter 82, a controlling circuit 86 and a digital-analog converter 83. The control circuit 86 causes the voltage information of the lamp light adjusting power supply 84 to be recorded as manual setting information on an IC card 87 which is data recording means for each of a plurality of objective lenses. Each time the electrically driven revolver 11 is changed over, the controlling circuit automatically adjusts the source voltage of the lamp light adjusting power supply 84 through the digital-analog converter 83 on the basis of the voltage information stored at the last time for the newly selected objective lens.

Figure 11:
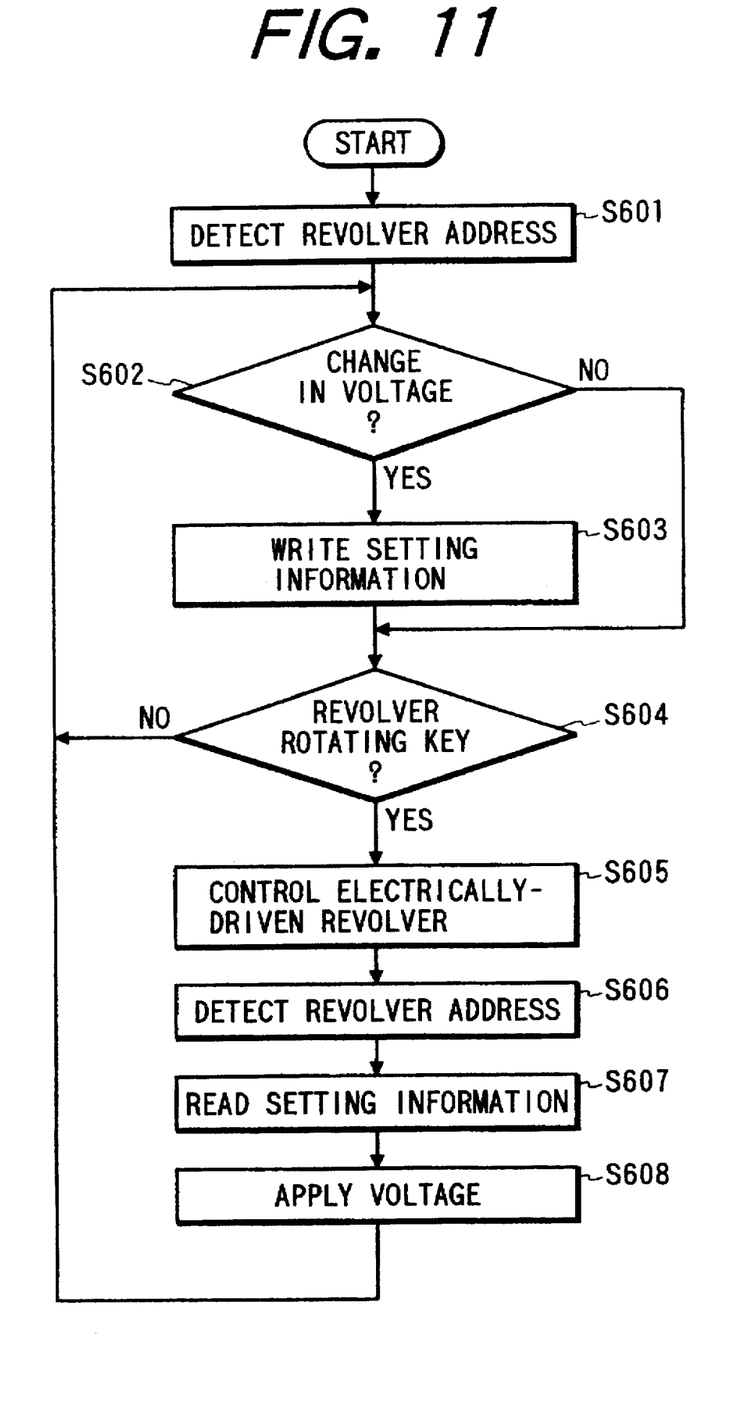
FIG. 11 is a flow chart showing an example of the operation of the sixth embodiment of the electrically driven type microscope according to the present invention.

FIG. 11 is a flow chart showing the operation of the present embodiment. The controlling circuit 86 detects a revolver address in advance (S601). When the dial or the like of the voltage adjuster 81 is manually operated and the output voltage of the analog-digital converter 82 fluctuates, the controlling circuit causes the voltage after this fluctuation to be stored in the IC card 87 together with the positional information of the revolver 11 (S603). Thereafter, when the electrically revolver 11 is rotated (S604 and S605), the controlling circuit 86 detects the position of the revolver after rotation (S606), and reads out manual setting information from the IC card 87 together with this detected position of the revolver (S607). It then outputs to the digital-analog converter 83 a control voltage of a value based on the read-out setting information (S608) and effects the adjustment of the lamp light adjusting power supply 84.

The present embodiment, like the first embodiment, may be designed such that when the revolver rotating key 3 is operated, the output value of the analog-digital converter 82 is stored in the IC card 87 together with the revolver address.

In the above-described first to sixth embodiments, the adjusting mechanisms to be adjusted in conformity with the interchange of the objective lens are used individually, namely, the stage positioning device, the field stop device portion, the aperture stop device portion, the light adjusting portion and the source voltage supply, respectively, but design may be made such that a plurality of adjusting members are used in combination. In this case, the manual setting information of the plurality of adjusting mechanisms is recorded on the IC card for each of the pieces of information of a plurality of objective lenses.

In each of the above-described embodiments, the revolver 11 is an electrically driven revolver rotatively driven by the motor 10, but alternatively, the revolver 11 may be of a manually driven type. Again in such case, by providing revolver position detecting means, when the revolver is rotated, the manual setting information such as the position of each adjusting member mechanism before the rotation can be recorded together with the positional information of the revolver.

In each of the above-described embodiments, the data storing portion is an IC card and is removably mountable and therefore, the setting manual information of the adjusting mechanism can be sequentially rewritten each time the microscope is used. Also, if each user has his own IC card and the actually adjusted state is recorded thereon, adjustment data conforming to the user's liking can be accumulated and recorded on his IC card. Thus, when a plurality of users jointly use the electrically driven microscope, each can use his own IC card to thereby automatically adjust the microscope in accordance with his own preferences.

Also, the data recording portion need not be an IC card, but may, for example, be a memory device fixed to the microscope.

The adjusting portions are not limited to those in the above-described embodiments, but may be various other portions, such as a ring stop turret and a condenser turret.

What is claimed is:

1. An electrically driven microscope comprising:
   an interchanging device which interchanges a plurality of objective lenses;
   a determination device for determining which of said lenses is disposed in an optical path of the microscope;
   an adjusting system of which adjustment is effected during observation of a sample;
   a manually settable operating system for drivingly operating said adjusting system;
   a data recording portion for recording plural sets of manual setting information, each set corresponding to a different objective lens and containing information indicating at least one manual setting of said operating system for the corresponding objective lens;
   an electrical driving system for driving said adjusting system; and
   a driving control circuit for controlling said electrical driving system based on information from the set of manual setting information corresponding to an objective lens determined to be in said optical path by said determination device in association with an interchange effected by said interchanging device, thereby effecting adjustment of said adjusting system.

2. A microscope according to claim 1, wherein said interchanging device includes a revolver for holding objective lenses differing in magnification from one another, and wherein said determination device has a revolver position detector for detecting the rotational position of said revolver.

3. A microscope according to claim 2, wherein said revolver is an electrically driven revolver, said microscope further comprising a recording control circuit for causing said data recording portion to record manual setting information when said revolver is driven.

4. A microscope according to claim 1, further comprising:
   a recording control circuit for causing said data recording portion to record manual setting information when said operating system is manually set.

5. A microscope according to claim 3, wherein each of said recording control circuit and said driving control circuit includes a microcomputer.

6. A microscope according to claim 4, wherein each of said recording control circuit and said driving control circuit includes a microcomputer.

7. A microscope according to claim 1, wherein said adjusting system includes an adjusting mechanism disposed in an illuminating optical system of the microscope for changing an illuminating condition.

8. A microscope according to claim 7, wherein said adjusting system includes a mechanism for adjusting at least one of a stop portion of a field stop device, a stop portion of an aperture stop device, a filter adjusting device of a light adjusting device, and a lamp power supply adjusting portion of an illuminating device.

9. A microscope according to claim 1, wherein said adjusting system includes a mechanism for adjusting a stage of a stage vertically moving device.

10. A microscope according to claim 1, wherein said data recording portion is removably mountable with respect to a microscope body of the microscope.

11. A microscope according to claim 1, wherein said data recording portion accumulates manual setting information indicating a plurality of manual settings of said operating system for each objective lens, and said driving control circuit statistically processes the manual setting information accumulated by said data recording portion for each lens and determines a corresponding adjustment amount of said adjusting system for each lens.

12. A microscope comprising:

an interchanging device which interchanges a plurality of objective lenses;

a determination device for determining which of said lenses is disposed in an optical path of the microscope;

a manually settable adjusting mechanism, disposed in an illuminating system for applying light to a sample, for adjusting an illumination characteristic of the applied light;

a data storing portion for storing therein plural sets of manual setting information, each set corresponding to a different objective lens and containing information indicating at least one most recent manual setting of said adjusting mechanism for the corresponding objective lens; and a setting device for reading out the information from the set of manual setting information stored in said data storing portion corresponding to the objective lens determined to be in said optical path by said determination device in association with an interchange effected by said interchanging device, and for electrically controlling said adjusting mechanism based on said read-out information to thereby set the illumination characteristic.

13. A microscope comprising:

an interchanging device which interchanges a plurality of objective lenses;

a determination device for determining which of said lenses is disposed in an optical path of the microscope;

a manually settable moving device capable of adjusting the position of a stage, on which a sample is placed for observation, along said optical path of the microscope;

a data storing portion for storing therein plural sets of manual setting information, each set corresponding to a different objective lens and containing information indicating at least one most recent manual setting of said moving device for the corresponding objective lens; and a setting device for reading out the information from the set of manual setting information stored in said data storing portion corresponding to an objective lens determined to be in said optical path by said determining device in association with an interchange effected by said interchanging device.

14. An electrically driven microscope comprising:

a manually settable adjusting mechanism that is adjusted during observation of a sample;

a driving device to drive said adjusting mechanism electrically;

a revolver to hold a plurality of objectives and to change an objective disposed in an optical path of the microscope;

a memory for storing a plurality of manual setting values, each corresponding to a different objective lens and indicating a manual setting of said adjusting mechanism for the corresponding objective lens;

a determination device to determine which of said lenses is disposed in said optical path; and a controlling circuit connected to said determination device, said memory, and said driving device, to read out the stored manual setting value corresponding to an objective lens determined to be in said optical path by said determination device, and to output a controlling signal to the driving device so as to set said adjusting mechanism based on the read-out setting value, wherein, when a setting of said adjusting mechanism is manually changed during observation, said controlling circuit rewrites the stored manual setting value corresponding to the objective disposed in said optical path to a value indicating the changed setting without altering the other stored manual setting values.

15. An electrically driven microscope comprising:

a manually settable adjusting mechanism that is adjusted during observation of a sample;

a driving device to drive said adjusting mechanism electrically;

a revolver to hold a plurality of objectives and to change an objective disposed in an optical path of the microscope;

a memory for storing a plurality of manual setting values, each corresponding to a different objective lens and containing indicating a manual setting of said adjusting mechanism for the corresponding objective lens;

a determination device to determine which of said lenses is disposed in said optical path; and a controlling circuit connected to said determination device, said memory, and said driving device, to read out the stored manual setting value corresponding to an objective lens determined to be in said optical path by said determination device, and to output a controlling signal to the driving device so as to set said adjusting mechanism based on the read-out setting value, wherein said controlling circuit obtains a manual setting value of said adjusting mechanism in association with an operation of the revolver to change an objective lens disposed in said optical path, and stores the obtained value to said memory as the manual setting value corresponding to the objective disposed in said optical path just before the operation of the revolver.

16. An electrically driven microscope comprising:

a manually settable adjusting mechanism that is adjusted during observation of a sample;

a driving device to drive said adjusting mechanism electrically;

a revolver to hold a plurality of objectives and to change an objective disposed in an optical path of the microscope;

a memory for storing plural sets of manual setting information, each set corresponding to a different objective lens and containing information indicating a plurality of manual settings of said adjusting mechanism for the corresponding objective lens;

a determination device to determine which of said lenses is disposed in said optical path; and a controlling circuit connected to said determination device, said memory, and said driving device, wherein, when a setting of said adjusting mechanism is manually changed, said controlling circuit obtains a changed setting of the adjusting mechanism and causes said memory to store information indicating said changed setting in the set of manual setting information corresponding to the objective disposed in said optical path, and in association with a change from a first objective lens to a second objective lens in said optical path, the controlling circuit reads out from said memory the information indicating the plurality of manual settings in the set of manual setting information corresponding to the second objective lens, determines an adjustment amount of said adjusting mechanism from the read-out information, and outputs to said driving device a controlling signal based on said adjustment amount, thereby setting the adjusting mechanism to said adjustment amount.

17. A microscope according to claim 16, wherein said controlling circuit determines an adjustment amount by statistically processing the read-out information.

18. An electrically driven microscope comprising:

a manually settable adjusting mechanism that is adjusted during observation of a sample;

a driving device to drive said adjusting mechanism electrically;

a revolver to hold a plurality of objectives and to change an objective disposed in an optical path of the microscope;

a memory for storing plural sets of manual setting information, each set corresponding to a different objective lens and containing information indicating a plurality of manual settings of said adjusting mechanism for the corresponding objective lens;

a determination device to determine which of said lenses is disposed in said optical path; and a controlling circuit connected to said determination device, said memory, and said driving device;

wherein, in association with a change from a first objective lens to a second objective lens in said optical path, said controlling circuit obtains a manual setting of said adjusting mechanism, causes said memory to store information indicating said manual setting in the set of manual setting information corresponding to the first objective lens, reads out from said memory the information indicating said plurality of manual settings in the set of manual setting information corresponding to the second objective lens, determines an adjustment amount of said adjusting mechanism from said read-out information, and outputs to said driving device a controlling signal based on said adjustment amount, thereby setting the adjusting mechanism to said adjustment amount.

19. A microscope according to claim 18, wherein said controlling circuit determines an adjustment amount by statistically processing the read-out information.

* * * * *